US007416371B2

(12) United States Patent
Scott et al.

(10) Patent No.: US 7,416,371 B2
(45) Date of Patent: Aug. 26, 2008

(54) WOOD BORING BIT WITH INCREASED SPEED, EFFICIENCY AND EASE OF USE

(75) Inventors: Gary F. Scott, Huntersville, NC (US); David Jackson Trettin, Atlanta, GA (US)

(73) Assignee: Irwin Industrial Tool Company, Huntersville, NC (US)

( * ) Notice: Subject to any disclaimer, the term of this patent is extended or adjusted under 35 U.S.C. 154(b) by 557 days.

(21) Appl. No.: 10/908,193

(22) Filed: May 2, 2005

(65) Prior Publication Data

US 2005/0249563 A1 Nov. 10, 2005

Related U.S. Application Data

(60) Provisional application No. 60/568,493, filed on May 4, 2004.

(51) Int. Cl.
*B23B 51/00* (2006.01)

(52) U.S. Cl. ........................ 408/1 R; 408/213; 408/214

(58) Field of Classification Search ......... 408/211-214, 408/230, 1 R, 227, 199; *B27G 15/00, 15/02*
See application file for complete search history.

(56) References Cited

U.S. PATENT DOCUMENTS 29,793 A 8/1860 Ives
29,883 A 9/1860 Hathaway
141,324 A 7/1873 Clark
242,362 A 5/1881 Parmelee
287,538 A 10/1883 Hall
306,907 A * 10/1884 Dimitt ........................ 408/213
361,522 A * 4/1887 Irwin ......................... 408/213
404,197 A 5/1889 Irwin
413,159 A 10/1889 Bailey
458,640 A * 9/1891 Phillips ...................... 408/214
461,897 A 10/1891 Ford
782,221 A * 2/1905 Creeden ..................... 408/102
787,664 A 4/1905 Converse
877,592 A 1/1908 Parry et al.
1,139,198 A 5/1915 Lund
1,165,854 A 12/1915 Davis
1,275,889 A 8/1918 Flander
1,398,070 A 11/1921 Doyle
1,398,780 A 11/1921 Hayden (Continued)

FOREIGN PATENT DOCUMENTS

FR 2811606 A1 * 1/2002

(Continued)

*Primary Examiner*—Daniel W Howell
(74) *Attorney, Agent, or Firm*—Dennis J. Williamson; Moore & Van Allen, PLLC

(57) ABSTRACT

A wood boring bit for boring holes in wood and other similar work surfaces having a central longitudinal axis, a main body, a pilot screw tip and a partial flute with a cutting edge and a cutting spur. The flute portion may be defined by a partial helical section having a distal end joined to the main body and a lead edge disposed toward said screw tip. The distal end and the lead edge preferably do not overlap along the central axis and are equal to or less than 360° from one another around the axis. The partial flute provides improved waste removal and allows the user to access the cutting edge of the flute for maintenance purposes.

29 Claims, 7 Drawing Sheets

U.S. PATENT DOCUMENTS

| | | | | |
|---|---|---|---|---|
| 1,410,534 | A | 3/1922 | Stein | |
| 1,465,870 | A * | 8/1923 | Sanders | 408/213 |
| 2,358,077 | A * | 9/1944 | Koett | 408/213 |
| 2,627,292 | A | 2/1953 | Kronwall | |
| 2,689,131 | A | 9/1954 | Priest | |
| 2,692,627 | A | 10/1954 | Steams | |
| 2,811,184 | A | 10/1957 | Brzozowski | |
| 3,460,409 | A | 8/1969 | Stokey | |
| 3,543,820 | A | 12/1970 | Tulumello | |
| 4,079,766 | A | 3/1978 | Conley et al. | |
| 4,134,704 | A | 1/1979 | Jackley et al. | |
| 4,225,275 | A | 9/1980 | Elliott | |
| 4,744,704 | A | 5/1988 | Galvefors | |
| 5,099,933 | A | 3/1992 | Schimke et al. | |
| 5,145,018 | A | 9/1992 | Schimke et al. | |
| 5,193,951 | A | 3/1993 | Schimke | |
| 5,458,211 | A | 10/1995 | Dennis et al. | |
| 5,486,072 | A | 1/1996 | Green | |
| 5,570,978 | A | 11/1996 | Rees et al. | |
| 5,820,319 | A * | 10/1998 | Hull et al. | 408/214 |
| 5,967,711 | A | 10/1999 | Cochran | |
| 6,042,438 | A | 3/2000 | Dean | |
| 6,174,111 | B1 | 1/2001 | Anjanappa et al. | |
| 6,227,774 | B1 | 5/2001 | Haughton et al. | |
| 6,354,773 | B1 | 3/2002 | Konen | |
| 6,431,801 | B2 | 8/2002 | Vasudeva et al. | |
| 6,499,919 | B2 | 12/2002 | Feld | |
| 6,652,202 | B2 | 11/2003 | Remke et al. | |
| 2002/0127071 | A1 | 9/2002 | Vasudeva | |
| 2004/0052594 | A1 | 3/2004 | Singh | |
| 2004/0156689 | A1 | 8/2004 | Shen | |

FOREIGN PATENT DOCUMENTS

| | | |
|---|---|---|
| WO | WO-98/05459 | 2/1998 |
| WO | WO-03/092938 | 11/2003 |
| WO | WO-2004/080632 | 9/2004 |

* cited by examiner

WOOD BORING BIT WITH INCREASED SPEED, EFFICIENCY AND EASE OF USE

CROSS REFERENCE TO RELATED APPLICATIONS

This application is a non-provisional patent application of Ser. No. 60/568,493, filed May 4, 2004, entitled "High Efficiency Wood Boring Bit", which is incorporated herein in its entirety by reference and is assigned to the same assignee as this application and claims the benefit of the filing date of provisional application Ser. No. 60/568,493 under 35 USC §119(e).

BACKGROUND OF THE INVENTION

Drill bits are used by a variety of industries for a variety of purposes. For this reason there are many different types of drill bits that a user may choose from depending on the job that they intend to do.

Flat bits or spade bits are predominately used by electricians and plumbers to bore larger holes in wood for running electrical wire and water lines. Generally, speed, hole quality, and ease of use are important features of spade bits. Currently flat bits address only hole quality, leaving the user wanting a bit that is faster and easier to use.

An auger-type drill bit has a number of advantages over spade bits. For example, the auger bit generally has a screw tip which aides the user by making the drill bit self-feeding, thereby increasing the ease of use. Augers usually include a helical section-shaped flute that extends up the body of the bit to provide a mechanism for waste removal, thereby increasing the speed and efficiency of use.

The auger too has disadvantages, such as a flute that is too narrow or too long causing the waste material to get caught in the bit, a cutting edge that becomes dull, making the bit increasingly difficult to use, and unbalanced or poor hole quality. Therefore, it would be beneficial to combine the advantages of a spade bit and an auger bit that is capable making wood boring drill bits easier to use, more precise, and faster. In addition, it would be desirable to create a wood boring drill bit with a cutting edge that is not cumbersome to sharpen.

BRIEF SUMMARY OF THE INVENTION

One aspect of this invention includes a wood boring bit for boring a hole along a longitudinal central axis including a shaft portion having a first end and a second end, a pilot screw tip extending from the first end, and a flute portion adjacent the first end. The flute portion is defined by a partial helical section, the partial helical section having a distal end joined to the shaft portion and a lead edge disposed toward the screw tip. The distal end and the lead edge of the flute desirably do not overlap along the central axis and are equal to or less than 360° from one another around the axis.

In another aspect of this invention, a wood boring bit extending along a longitudinal central axis includes a main body and a flute attached to the main body. The flute is defined by a partial helical section having a distal end and a lead edge. The distal end and the lead edge desirably do not overlap along the central axis and are disposed equal to or less than 360° from one another. Optionally, the bit may include a screw tip attached to the main body.

In yet another aspect of this invention a wood boring bit having a longitudinal central axis includes a screw tip, a shaft portion having a first end and a second end, and a first flute portion. The first flute portion is defined by a partial helical section, the partial helical section having a distal end integral to the second end of the shaft portion, and a lead edge disposed toward the screw tip. The distal end and the lead edge of the first flute desirably do not overlap along the central axis and are equal to or less than 360° from one another around the axis. This bit further includes a second flute portion having an outer surface and a lead edge. The lead edge is defined by a cutting edge and the outer surface having a cutting spur extending slightly outward therefrom.

Another aspect of this invention includes a kit for a wood boring drill assembly. The kit including a drill implement and a wood boring bit for boring a hole along a longitudinal central axis. The wood boring bit is desirably removably attached to the drill implement and includes a shaft portion having a first end and a second end, a pilot screw tip extending from the first end, and a flute portion adjacent the first end. The flute portion is desirably defined by a partial helical section, the partial helical section having a distal end joined to the shaft portion and a lead edge disposed toward the screw tip. The distal end and the lead edge do not overlap along the central axis and are equal to or less than 360° from one another around the axis.

Also, another aspect of the present invention includes a method for boring a hole in a work surface including the steps of providing a drill, providing a wood boring bit as described in any of the above aspects, removably attaching the wood boring bit to a receiving portion of the drill, and holding the drill a distance away from a work piece and exerting pressure on the work piece with the wood boring bit so that the bit is urged through the work surface creating a hole in the surface.

Further features of the invention will be described or become apparent in the course of the following detailed description.

BRIEF DESCRIPTION OF SEVERAL VIEWS OF THE DRAWINGS

The drawings will now be described by way of example only, with reference to the accompanying drawings, in which.

DETAILED DESCRIPTION OF THE INVENTION

Figure 1:
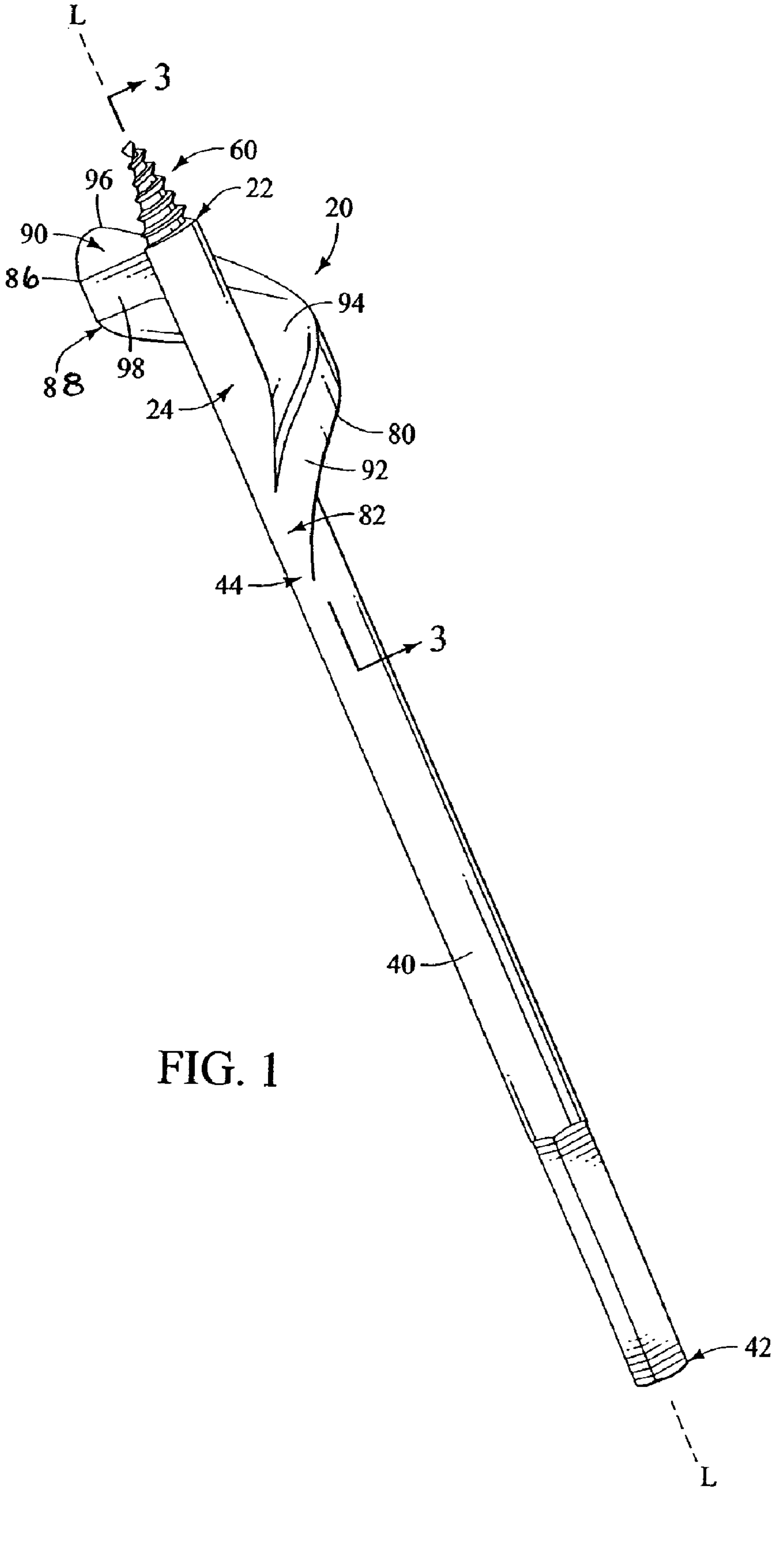
FIG. 1 is a front perspective view of an embodiment of the wood boring bit of the present invention.
Figure 2:
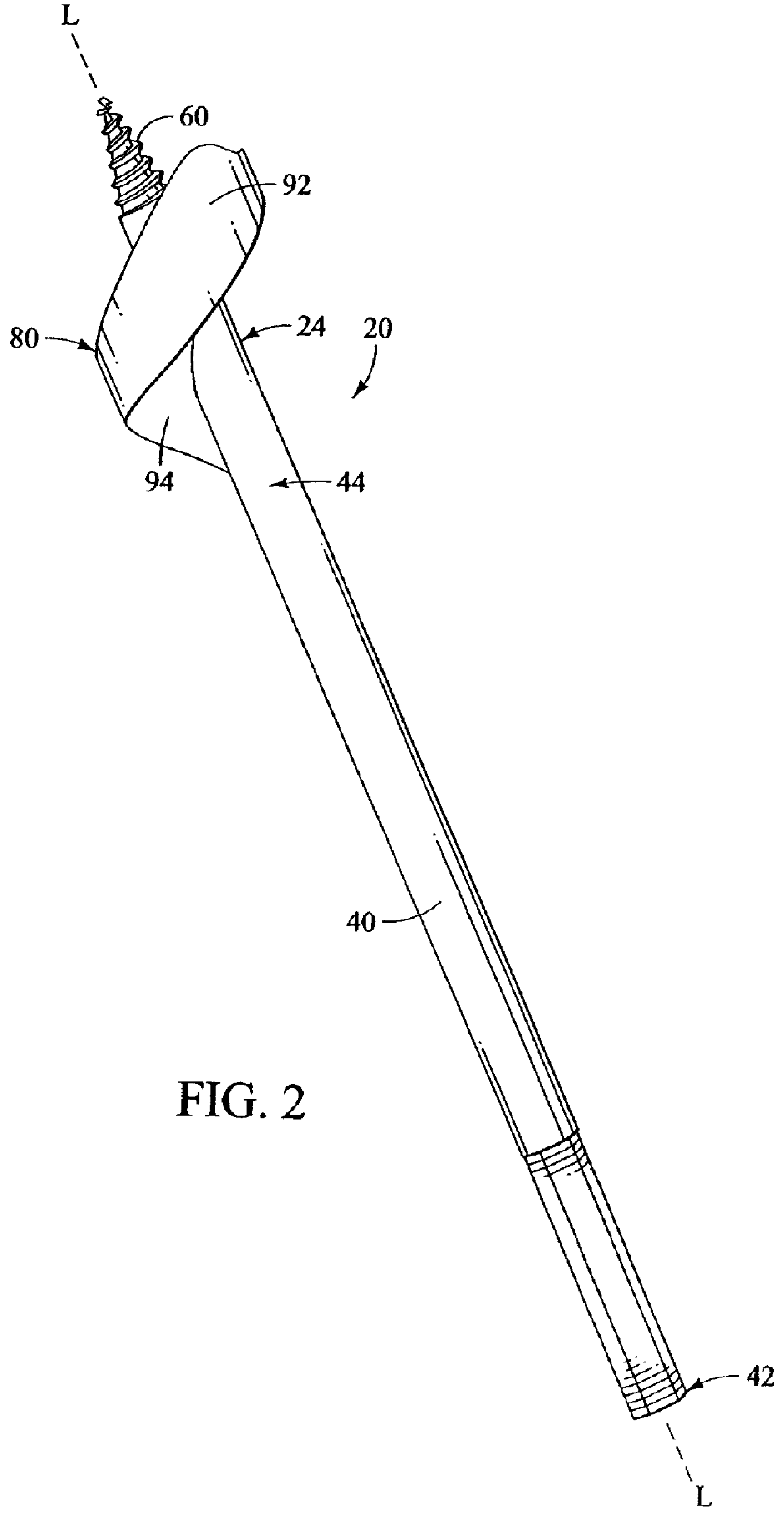
FIG. 2 is a rear perspective view of the wood boring bit of FIG. 1.

Referring now to the drawings and in particular FIGS. 1 and 2, the wood boring bit 20 of the present invention has an elongate shaft or main body portion 40, a screw tip 60, and a partial flute 80. The flute 80 includes a lead edge 86 with a cutting edge 88 and a cutting spur 90.

The main body portion 40 has a first end 42 a second end 44 disposed at opposite sides of a longitudinal central axis L. The first end 42 of the main body 40 is desirably adapted to removably fit into a drill (not shown). An annular groove (not shown) may be cast in the main body 40, approximately 0.25 inch from the end of the main body, toward the first end 42. This annular groove provides the bit with the ability to interface with a plurality of quick change apparatuses and to easily be used with different types of electric drills. The second end 44 of the main body 40 is preferably integrally forged with the partial flute portion 80 of the drill bit. The partial flute 80 extends between the second end 44 of the main body portion to the throat 22 of the bit 20, adjacent the screw tip 60.

The flute 80 includes a distal end 82, adjacent the main body portion 40 of the bit 20, and a leading edge 86 disposed toward the throat 22 of the bit 20. The partial flute 80 is defined by an outer surface 92 and an inner surface 94. The outer surface 92 is a helical structure that does not completely encircle the longitudinal central axis L of the drill bit 20. The distal end 82 of the flute 80 and the lead edge 86 of the flute 80 are disposed along the longitudinal central axis L. Desirably, the flute gradually recedes from the lead edge to the distal end of the flute, effectively decreasing the radius of the helical section as it descends the main body. Preferably, the distal end 82 progresses radially inwardly toward the shaft and does not radially overlap the lead edge along the axis L. Desirably, the distal end and the lead edge are less than 360° from one another (FIG. 1) around the axis.

Figure 4:
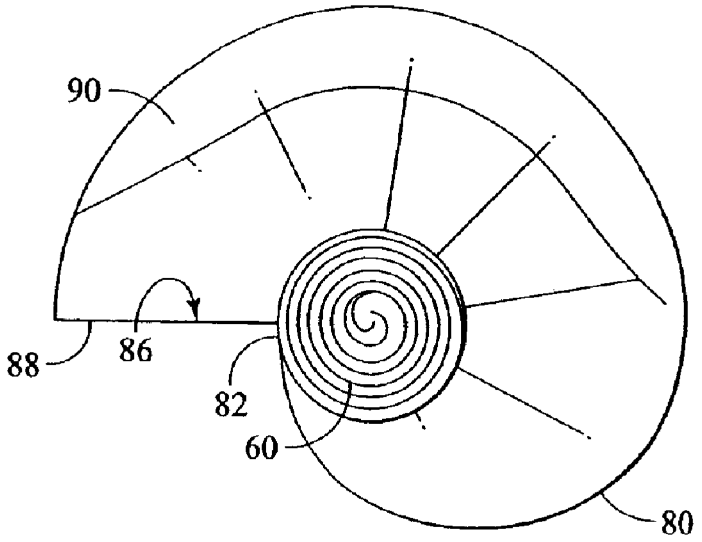
FIG. 4 is a representation of the top perspective view of the present invention.

The inner surface 94 of the flute 80 is defined by the warped or ramped surface of the helical section. The shape of the helix is a multitude of compound angles and projections. The shape of the flute 80 may be described as a nautilus shape when the bit is viewed from the top (FIG. 4). The nautilus shape is basically a circle that continuously spirals inward toward the central longitudinal axis but never overlaps. The spiral is preferably a logarithmic spiral, but may be defined as a hyperbolic or parabolic spiral. The nautilus-shaped flute minimizes the amount of material required to forge the tool and also helps prevent the bit from getting lodged in the work surface or wood in which it is to bore a hole.

Figure 7:
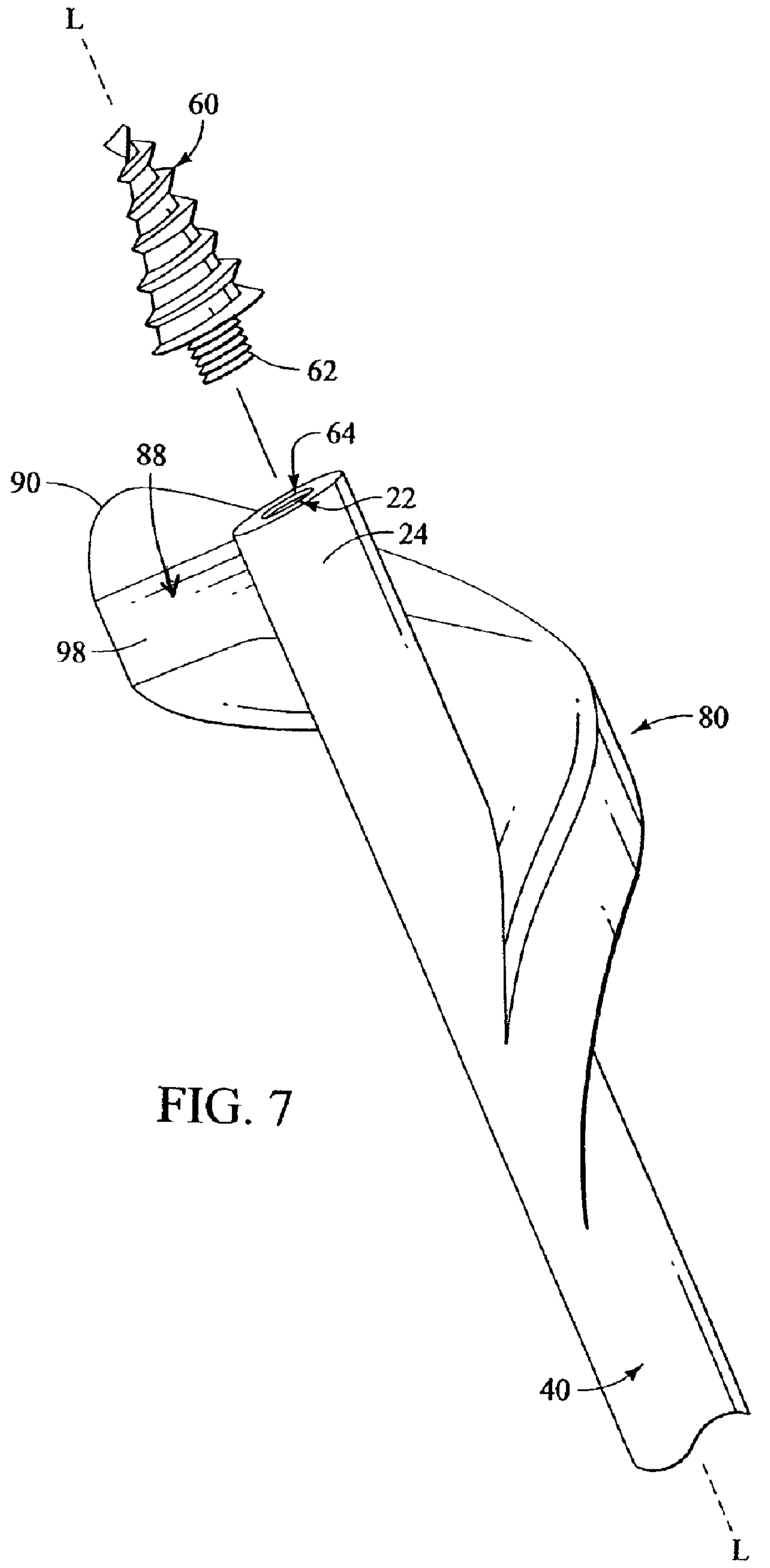
FIG. 7 is a front perspective view of another embodiment of the present invention.

The screw tip 60 is a self-feeding screw such that in use the screw tip 60 causes the bit 20 to engage and be drawn into the wood or the work surface. The screw tip 60 may be integrally forged with the throat 22 of the bit 20 or it may be removable from the rest of the bit (FIG. 7). If the tip 60 is removable, it may include a second screw portion 62 that is threaded into a mating hole 64 in the throat 22 of the bit 20.

Figure 3:
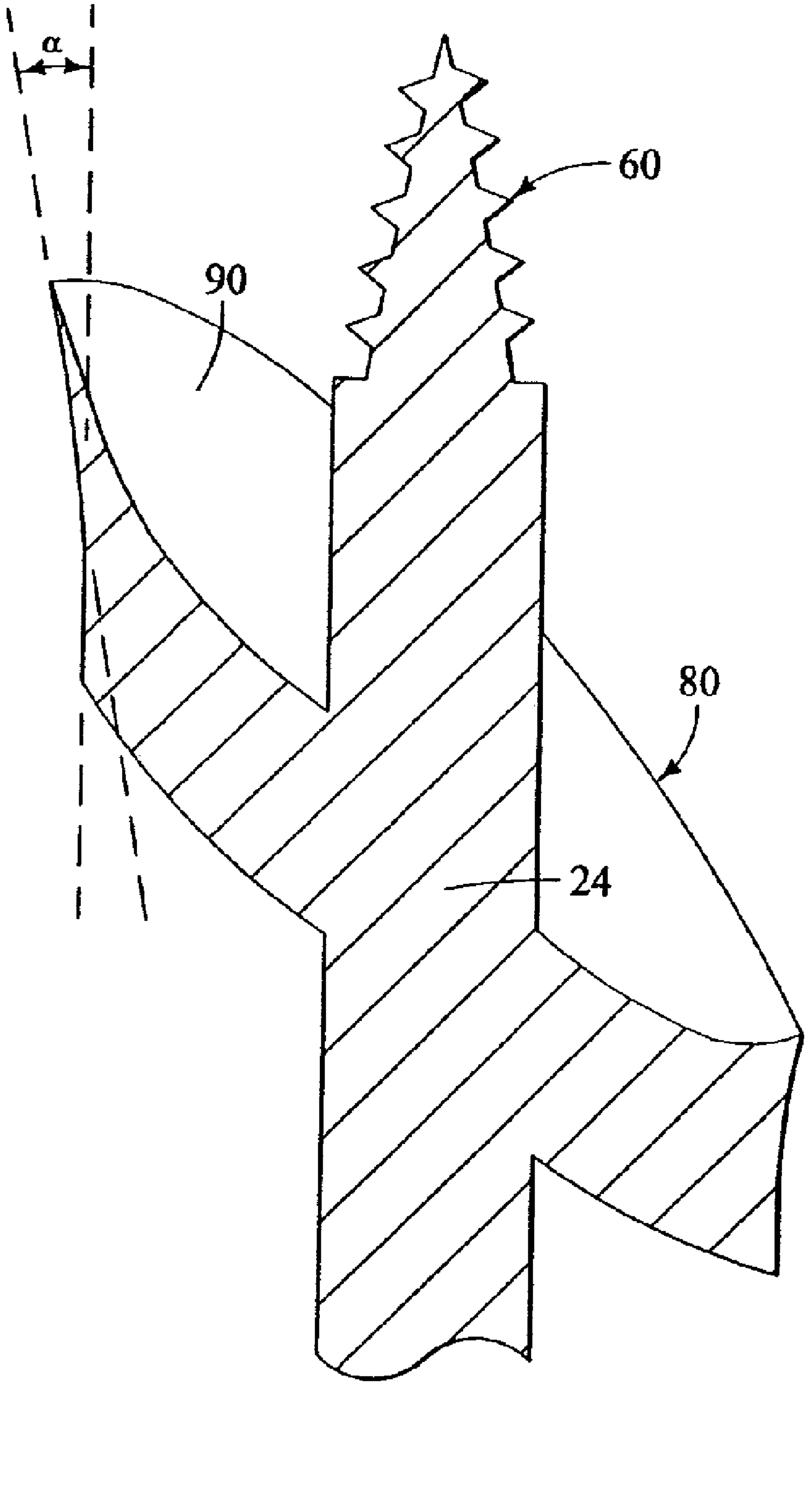
FIG. 3 is a cross section along line 3-3 of FIG. 1.

Referring again to FIG. 1 and now to FIG. 3, desirably, the outer surface 92 of the lead edge 86 of the flute 80 includes a cutting spur 90. The cutting spur 90 improves the hole quality and minimizes breakout. The spur 90 extends slightly outwardly from the outer surface 92 of the flute 80. The distal edge 96 of the spur extends along the central longitudinal axis L at a slight angle $\alpha$ from the axis L. Preferably, the angle $\alpha$ is between about 1° and 5°, more preferably, between about 2° and 3°. The spur 90 defines the outer diameter of the bore hole of the bit which will be slightly larger than the diameter of the flute itself. This allows the bit to more easily move through the wood and prevents the bit from being lodged in the work surface.

Figure 8:
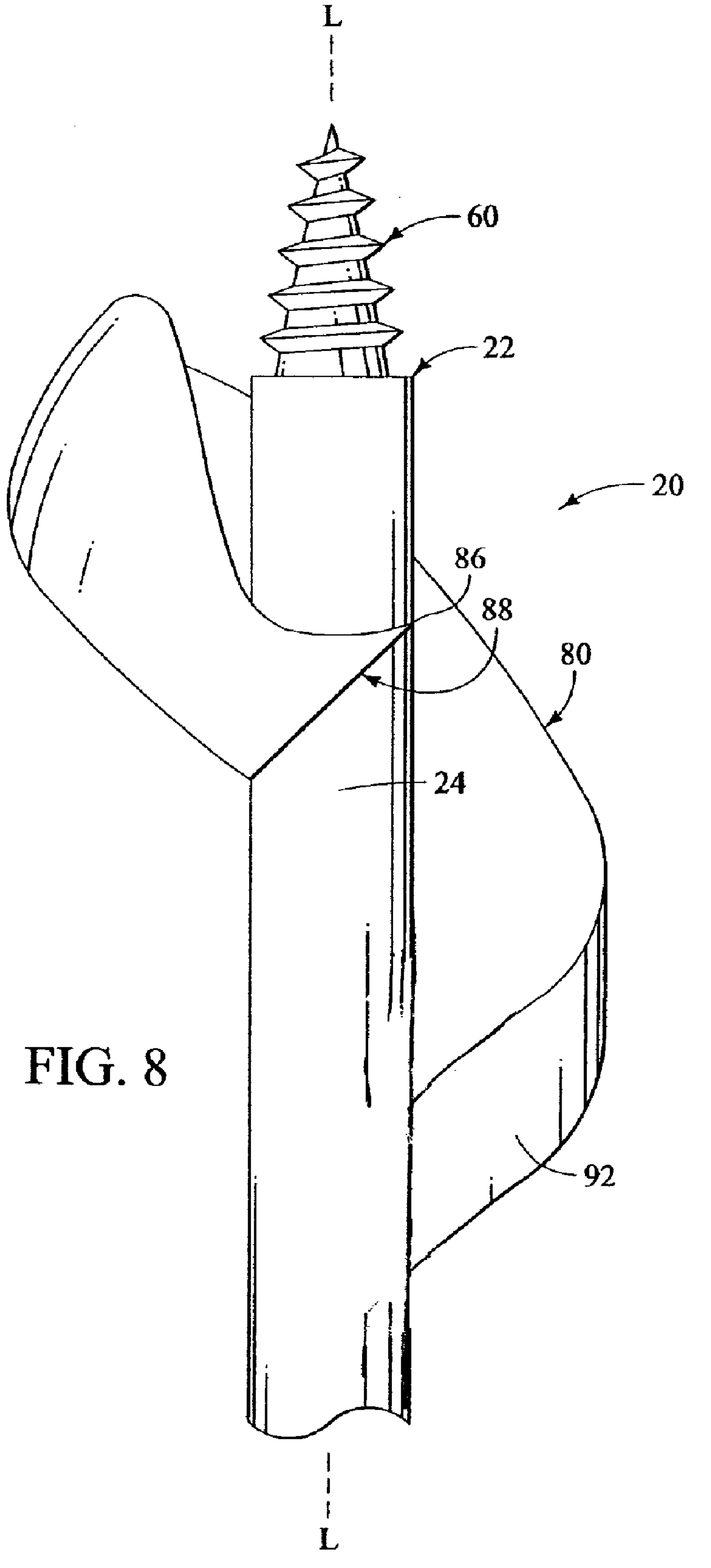
FIG. 8 is a side perspective view of an embodiment of the present invention.

Referring now to FIGS. 1 and 8, the cutting edge 88 is defined by the leading edge 86 of the flute 80. Desirably, the bit 20 includes a solid core 24 for added rigidity; however the bit 20 may be constructed without a solid core (not shown). The solid core 24 extends from the second end 44 of the main body portion through center of the flute 80 along the longitudinal central axis L and terminates at the throat 22 of the bit 20. The outer surface 92 of the flute 80 at the lead edge 86 may be separated from the solid core 24 of the bit 20 by the cutting edge 88.

Figure 5:
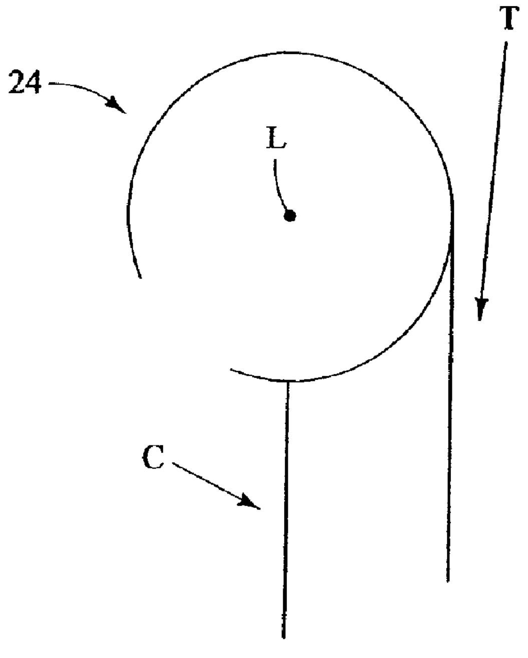
FIG. 5 is a schematic representation of the placement of the cutting edge on the main body of the wood boring bit of the present invention.

Referring to FIG. 5, the cutting edge 88 can either be placed at the center C of the main body 40, perpendicular to the central axis, or may be ahead of center or tangent T to the outer surface of the solid core 24. The cutting edge 88 may be cast or forged integrally with the flute 80 of the bit 20. The edge 88 may be cast at an angle between 90° and 30°, thereby creating a cutting surface 98. Desirably the surface will be at a 45° angle from the central axis. See FIG. 8.

Desirably, the cutting edge 88 is re-sharpenable to extend the life of the bit. Typically, cutting edges of auger bits are difficult to re-sharpen. Because of the partial flute 80, it is easier for the user to access the cutting edge 88 and the cutting surface 98 to re-sharpen them repeatedly.

Figure 6:
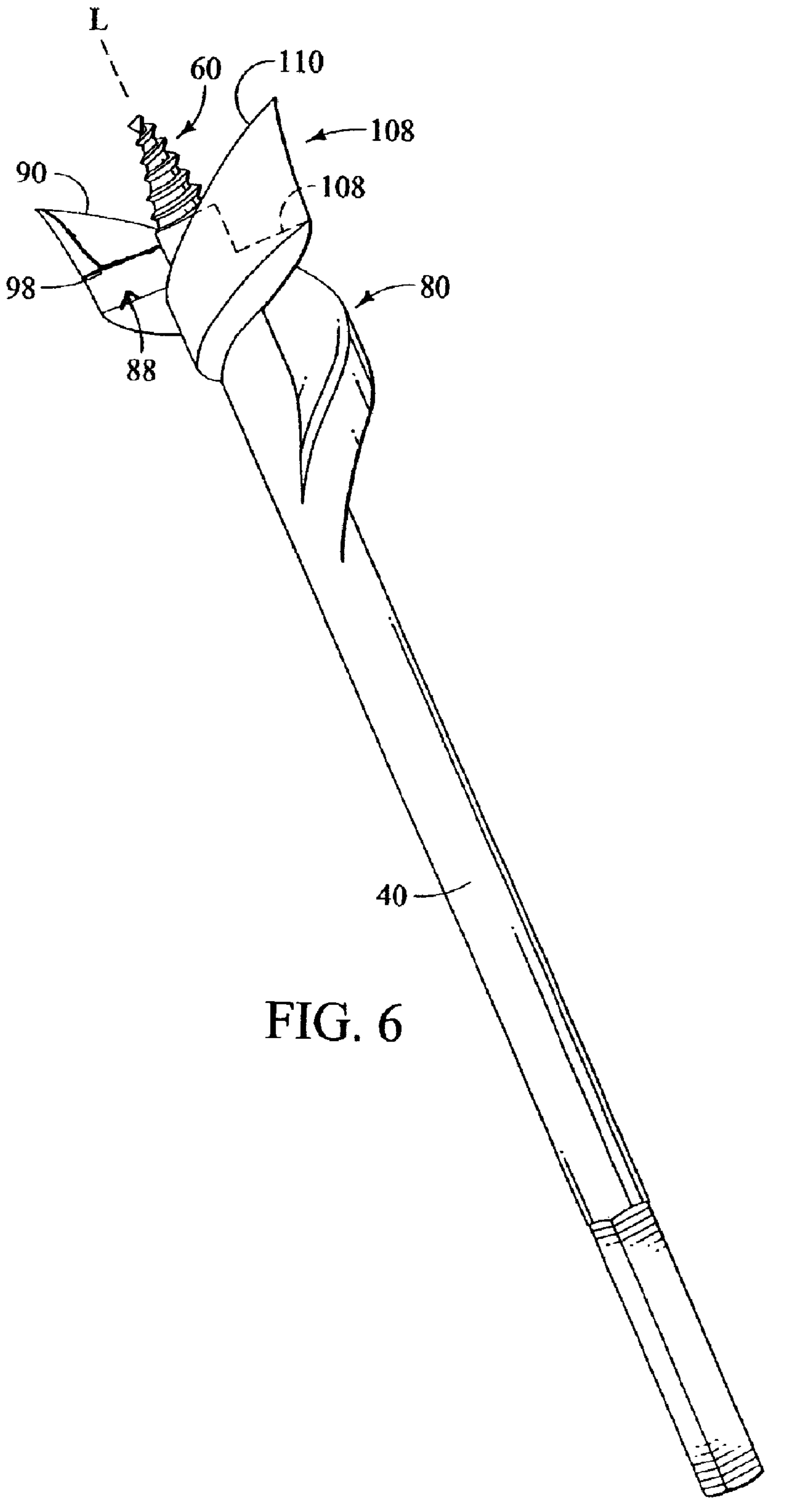
FIG. 6 is a front perspective view of an embodiment of the present invention.

Referring now to FIG. 6, the drill bit 20 of the present invention may include a second partial flute 100 disposed along the solid core 24 of the bit 20. Desirably, the second flute 100 is disposed toward the throat 22 of the bit 20 and includes a second cutting spur 110 and a second cutting edge 108. The second flute 100 provides a more balanced cut and better hole quality. For purposes of illustration, the second flute 100 will be similar to the first flute 80. The second flute 100, however, has an outer surface 112 which extends a shorter distance from the throat 22 of the bit 20 toward the distal end 102 of the second flute 100. The second flute 100 is disposed along the solid core 24 in a manner that does not disrupt the nautilus shape of the first flute 80 (see FIG. 4) in that it does not complete a circle around the longitudinal central axis L.

It will be appreciated that the above description related to embodiments by way of example only. Many variations on the invention will be obvious to those skilled in the art and such obvious variations are within the scope of the invention as described herein whether or not expressly described.

What is claimed is:

1. A wood boring bit for boring a hole along a longitudinal central axis comprising:

a shaft portion having a first end and a second end, a pilot screw tip extending from said first end; and a single flute portion;

said single flute portion adjacent said first end, wherein said single flute portion is defined by a partial helical section, said partial helical section having a distal end joined to said shaft portion and a lead edge disposed toward said screw tip;

wherein said distal end and said lead edge do not overlap along said central axis and are equal to or less than 360° from one another around said axis.

2. The wood boring bit of claim 1, wherein said distal end of said partial helical section is joined to said second end of said shaft portion.

3. The wood boring bit of claim 1, wherein said screw tip has a base approximately adjacent to said lead edge of said single flute portion and said lead edge of said single flute portion having a beveled cutting edge.

4. The wood boring bit of claim 3, wherein said cutting edge is integrally formed to said lead edge of said single flute portion.

5. The wood boring bit of claim 3, wherein said beveled cutting edge is beveled at between 30° and 90° from said central axis.

6. The wood boring bit of claim 3, wherein the cutting edge is approximately 45° from said central axis.

7. The wood boring bit of claim 1, wherein said single flute portion further comprises an outer surface approximately parallel to said central axis, and wherein said single flute portion includes a cutting spur disposed along said outer surface toward said lead edge.

8. The wood boring bit of claim 3, wherein said single flute portion further comprises an outer surface approximately parallel to said central axis, and wherein said single flute portion includes a cutting spur disposed along said outer surface toward said lead edge of said single flute portion.

9. A wood boring bit extending along a longitudinal central axis comprising:

a main body;

a screw tip attached to said main body; and one and only one flute attached to said main body, said flute defined by a partial helical section having a distal end and a lead edge;

wherein said distal end and said lead edge do not overlap along said central axis and are disposed equal to or less than 360° from one another.

10. The wood boring bit of claim 9, wherein said screw tip is removable from said main body.

11. The wood boring bit of claim 9, wherein said screw tip has a base approximately adjacent to said main body and said lead edge of said flute being disposed toward said base and including a beveled cutting edge.

12. The wood boring bit of claim 11, wherein said beveled cutting edge is beveled at between 30° and 90° from said central axis.

13. The wood boring bit of claim 12, wherein the cutting edge is approximately 45° from said central axis.

14. The wood boring bit of claim 9, wherein said flute further comprises an outer surface approximately parallel to said central axis, and wherein said flute includes a cutting spur disposed along said outer surface of said flute toward said lead edge.

15. The wood boring bit of claim 11, wherein said flute further comprises an outer surface approximately parallel to said central axis, and wherein said flute includes a cutting spur disposed along said outer surface of said flute toward said lead edge.

16. The wood boring bit of claim 14, wherein the flute further comprises an inner surface defined by a plane lying within a warped surface of said partial helical section.

17. The wood boring bit of claim 11, wherein said cutting edge is approximately tangent to said main body.

18. The wood boring bit of claim 11, wherein said cutting edge is approximately perpendicular to said central axis.

19. The wood boring bit of claim 11, wherein said bit further comprises a second flute defined by a second partial helical section having an outer surface and a lead edge defined by a second cutting edge beveled to an angle between 30° and 90°;

said bit further including a second cutting spur disposed along said outer surface of said second flute toward said lead edge.

20. A wood boring bit extending along a longitudinal central axis comprising:

a main body;

a single flute attached to said main body, said flute defined by a partial helical section having a distal end and a lead edge;

wherein said distal end and said lead edge do not overlap along said central axis and are disposed equal to or less than 360° from one another.

21. The wood boring bit of claim 20 wherein said lead edge of said flute includes a beveled cutting edge.

22. The wood boring bit of claim 21, wherein said beveled cutting edge is beveled at between 30° and 90° from said central axis.

23. The wood boring bit of claim 22, wherein the cutting edge is approximately 45° from said central axis.

24. The wood boring bit of claim 20, wherein said flute further comprises an outer surface approximately parallel to said central axis, and wherein said flute includes a cutting spur disposed along said outer surface of said flute toward said lead edge.

25. The wood boring bit of claim 21, wherein said cutting edge is approximately tangent to said main body.

26. The wood boring bit of claim 21, wherein said cutting edge is approximately perpendicular to said central axis.

27. The wood boring bit of claim 21, wherein said bit further comprises a second flute defined by a second partial helical section having an outer surface and a lead edge defined by a second cutting edge beveled to an angle between 30° and 90°;

said bit further including a second cutting spur disposed along said outer surface of said flute toward said lead edge.

28. A kit for a wood boring drill assembly, the kit comprising:

a drill implement;

a wood boring bit for boring a hole along a longitudinal central axis, said wood boring bit removably attached to said drill implement and comprising:

a shaft portion having a first end and a second end, a pilot screw tip extending from said first end, and a single flute portion adjacent said first end;

wherein said single flute portion is defined by a partial helical section, said partial helical section having a distal end joined to said shaft portion and a lead edge disposed toward said screw tip; and wherein said distal end and said lead edge do not overlap along said central axis and are equal to or less than 360° from one another around said axis.

29. A method for boring a hole in a work surface comprising:

providing a drill;

providing a wood boring bit comprising:

a shaft portion having a first end and a second end, a pilot screw tip extending from said first end, and a single flute portion adjacent said first end;

wherein said single flute portion is defined by a partial helical section, said partial helical section having a distal end joined to said shaft portion and a lead edge disposed toward said screw tip; and wherein said distal end and said lead edge do not overlap along said central axis and are equal to or less than 360° from one another around said axis;

removably attaching said wood boring bit to a receiving portion of said drill; and holding the drill a distance away from a work piece and exerting pressure on said work piece with said wood boring bit so that said bit is urged through the work surface creating a hole in said surface.

* * * * *